(12) United States Patent
Hadfield et al.

(10) Patent No.: US 7,766,121 B2
(45) Date of Patent: Aug. 3, 2010

(54) METHODS AND APPARATUS FOR CONDITIONING AND DEGASSING LIQUIDS AND GASES IN SUSPENSION

(75) Inventors: David Hadfield, Rudgwich (GB); Alastair Sinker, Winchester (GB); Ian Charles Smyth, Easton Winchester (GB)

(73) Assignee: Cyclotech Limited, Basingstoke, Hampshire (GB)

( * ) Notice: Subject to any disclaimer, the term of this patent is extended or adjusted under 35 U.S.C. 154(b) by 1260 days.

(21) Appl. No.: 11/313,554

(22) Filed: Dec. 20, 2005

(65) Prior Publication Data

US 2007/0138108 A1 Jun. 21, 2007

(51) Int. Cl.
C02F 1/46 (2006.01)
(52) U.S. Cl. ............. 181/142; 210/748.02; 210/748.01; 210/748.05; 366/108
(58) Field of Classification Search ................... 366/127, 366/108; 181/143; 210/178.01, 178.02, 210/178.03, 178.05; 73/592; 134/1
See application file for complete search history.

(56) References Cited

U.S. PATENT DOCUMENTS

| | | | |
|---|---|---|---|
| 2,300,761 A | 11/1942 | Amy | |
| 3,160,138 A | 12/1964 | Platzman | |
| 5,164,094 A | 11/1992 | Stuckart | |
| 5,225,089 A * | 7/1993 | Benes et al. | 210/748.05 |
| H001568 H * | 8/1996 | Huang et al. | 210/748.02 |
| 6,210,470 B1 | 4/2001 | Philips et al. | |

FOREIGN PATENT DOCUMENTS

| | | |
|---|---|---|
| FR | 1100986 | 9/1955 |
| GB | 2 260 581 | 4/1993 |
| SU | 760517 | 12/1988 |

OTHER PUBLICATIONS

Search Report dated Jul. 5, 2006, for Norwegian Patent Application No. 2005-6069.
European extended Search Report dated May 9, 2006, for European Patent Application No. 05257830.9.
Spengler, J. et al., "Ultrasound conditioning of suspensions—studies of streaming influence on particle aggregation on a lab- and pilot-plant scale" Ultrasonics, IPC Science and Technology Press Ltd., Guildform, GB, vol. 38, No. 1-8, Mar. 2000, pp. 624-628.
Benes, E. et al., Institute of Electrical and Electronics Engineers: "Ultrasonic separation of suspended particles" 2001 IEEE Ultrasonics Symposium Proceedings, Atlanta, Georgia, Oct. 7-10, 2001, IEEE Ultrasonics Symposium Proceeds, New York, New York: IEEE, US vol. 2 of 2, Oct. 7, 2001, pp. 649-659.

* cited by examiner

Primary Examiner—Walter D Griffin
Assistant Examiner—Cameron J Allen
(74) Attorney, Agent, or Firm—Sheridan Ross PC

(57) ABSTRACT

A method and apparatus are provided for the controlled application of ultrasonic energy for conditioning of mixtures of gas and liquids by evolving and/or agglomerating gas bubbles existing with or in a liquid or for coalescing droplets of liquid dispersed in another liquid. The invention in preferred embodiments thereof comprises a coalescing apparatus for increasing the droplet size of a mixture formed as a liquid dispersed in another liquid, and a de-gassing apparatus arranged to evolve and/or agglomerate gaseous bubbles in a gas/liquid mixture. In the apparatuses, ultrasonic transducers are used to impart vibrational energy to the mixtures.

40 Claims, 4 Drawing Sheets

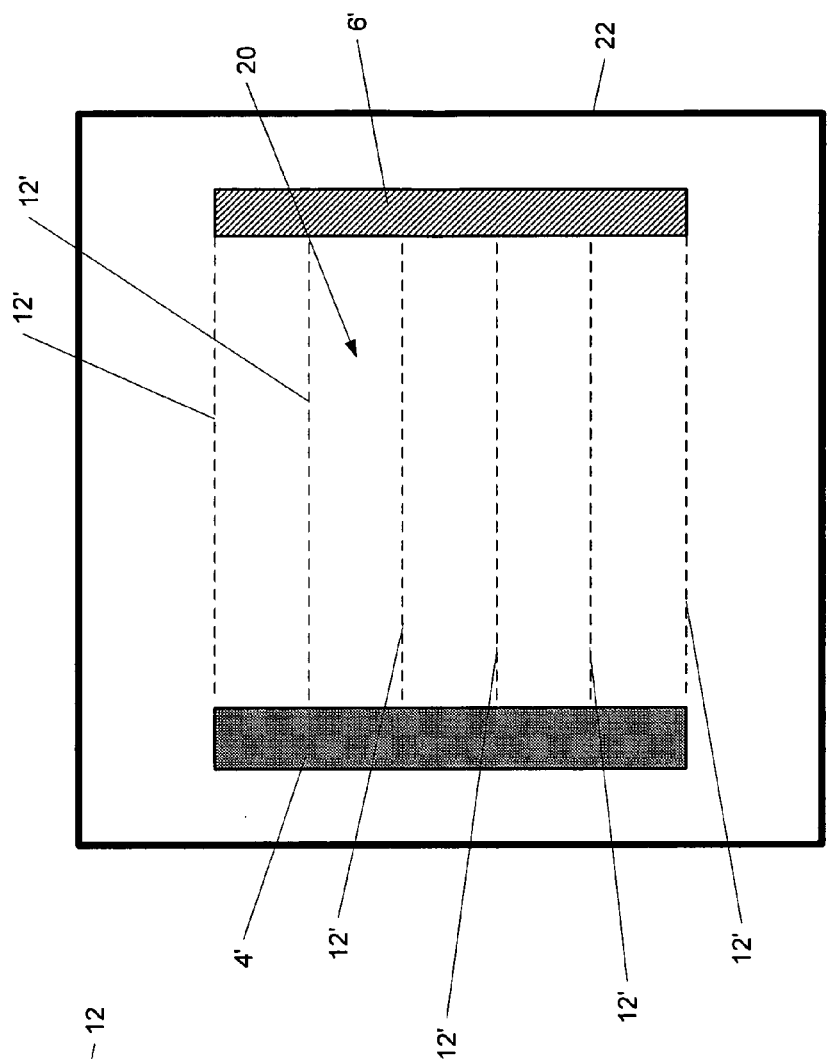
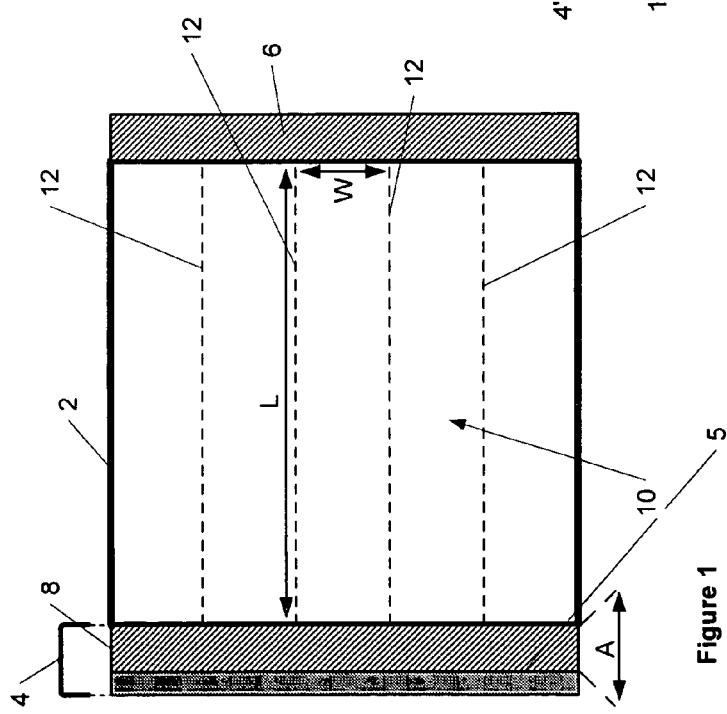
Figure 1
Figure 2

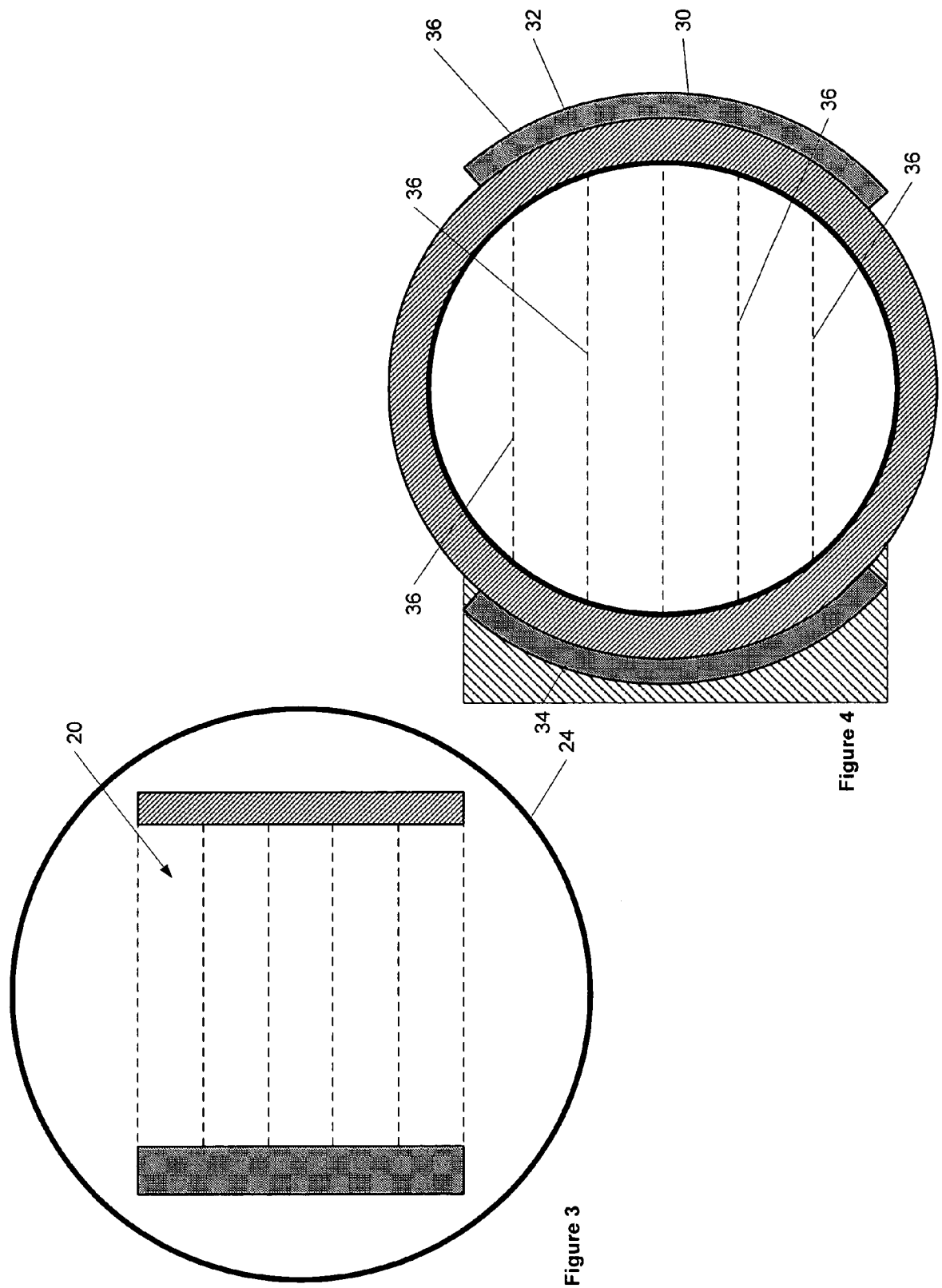

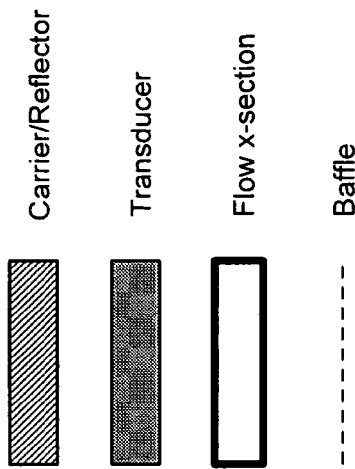
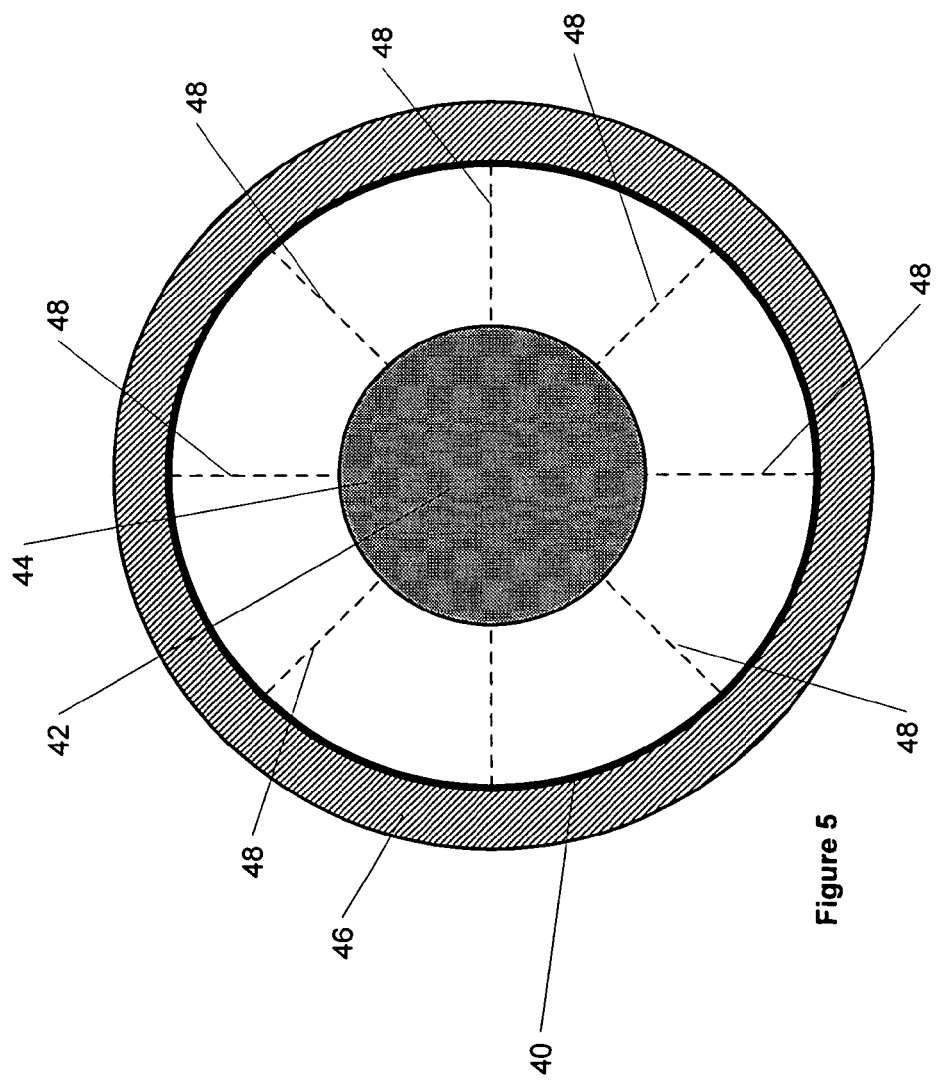
Figure 5

METHODS AND APPARATUS FOR CONDITIONING AND DEGASSING LIQUIDS AND GASES IN SUSPENSION

FIELD OF THE INVENTION

This invention relates to methods and apparatus for conditioning mixtures of gas and liquids by agglomerating gas bubbles existing with or in a liquid or for coalescing droplets of liquid dispersed in another liquid.

BACKGROUND OF THE INVENTION

Liquids produced in oilfield applications comprise a hydrocarbon component, (which may be a low density oil, termed condensate, or a medium density oil, termed medium oil or a high density oil, termed heavy oil) and some accompanying water which may be naturally occurring with the oil or may have been pumped into the reservoir to help drive out the oil. In order to process the oil successfully, the water must be separated out allowing relatively dry oil to be exported. In turn the water itself must be treated to an acceptable content of oil suitable for disposal.

Separation of water from a predominantly oil stream or treatment of a water stream to remove oil is generally more difficult and expensive as the droplet size of the dispersed, minority phase decreases. In many cases, there is a need to increase droplet size to improve separation or reduce costs of separation.

In most oilfield applications there is a need to remove gas from the liquid phase. This may be in the form of foam which needs to be broken down, discrete gas bubbles in a liquid which are required to be removed as part of a separation process, or dissolved gas which needs to be evolved from solution as discrete bubbles and removed as part of the separation process. Foaming is deleterious to the separation function since it may, for example, fill process equipment. It is commonly suppressed by the continuous use of additive chemicals. Furthermore, foaming can lead to false readings on apparatus such as level detectors in vessels. Therefore it is desirable to break down foam as quickly and cheaply as possible without the use of chemicals.

US Statutory Invention Registration No. H1568 discloses a coalescer which proposes the application of a standing wave ultrasonic field with a frequency range between 20 kHz and 1 MHz, with 680 kHz disclosed as an optimum frequency, for wastewater. The standing wave is created using at least two radially opposed pairs of transducers to cause coalescence of oil droplets in a flowing wastewater stream, with subsequent separation in conventional separators. The wastewater flows through a circular section vessel and the preferred embodiment includes seven pairs of transducers in groups at particular positions axially along and external to the treatment vessel. Intensity of application of acoustic energy is below cavitation levels.

However, the applicant's research has shown that the configuration disclosed in this document is unlikely to succeed as the fluid velocities typically encountered in pipeflow are too high and the flow is too turbulent for the ultrasonic forces to be effective. Also the residence in the field of the transducers is too short.

U.S. Pat. No. 5,527,460 described a multi-layered composite resonator system using a plane transducer and an opposing and parallel plane mirror for separating particles suspended in a fluid on a small scale. The technique uses an ultrasonic resonant wave.

Other prior art solutions include the use of electrostatic treatments which aim to use forces created by the interaction of electrically charged bodies to cause coalescence. For oil-from-water separation, filter-oalescers are commonly used to grow drop size by means of interference coalescence such as meshes or packing. Such techniques, in the case of electrostatic coalescers are not effective on water continuous-mixtures, or in the case of filter coalescers have limitations due to the likelihood of blockage.

U.S. Pat. No. 6,210,470 describes apparatus for degassing a moving liquid. The apparatus uses a transducer and reflector arrangement to produce ultrasonic standing waves which are inclined at an acute angle to a horizontal axis of liquid flow.

The techniques described below act to coalesce the dispersed droplets into larger droplets thereby improving the downstream separation efficiency and/or reducing the cost of downstream separation. In another embodiment the techniques described below are used to breakdown foam or promote the separation of suspended or dissolved gas, which also improves separation and/or reduces the costs of downstream separation.

SUMMARY OF THE INVENTION

The present invention generally relates to a method and apparatus for the controlled application of ultrasonic energy for conditioning of mixtures of gas and liquids by evolving and/or agglomerating gas bubbles existing with or in a liquid or for coalescing droplets of liquid dispersed in another liquid.

In a first aspect of the invention, there is provided coalescing apparatus for increasing the droplet size of a mixture formed as a liquid dispersed in another liquid comprising an ultrasonic transducer arranged to impart vibrational energy preferably in the frequency range 200 kHz to 1.5 MHz and more particularly in the range 400 kHz-1.5 MHz, to the mixture and a reflector located generally opposite the transducer, the apparatus further including at least one baffle extending in a direction generally between the transducer and the reflector and which divides the space between the transducer and reflector into separate volumes, the baffles being arranged in use to be sufficiently rigid to generally prevent substantial fluid flow between the volumes.

This provides the controlled application of ultrasonic energy in the form preferably of a resonant standing wave to generate coalescence in a dispersion (which may be static or flowing) of one liquid in another where separation of the liquid phases is a process objective. Differences in acoustic properties between the liquids allows the imposed acoustic radiation force to drive the droplets to the nodes or antinodes of the standing wave, thereby increasing local concentrations of the dispersion and the chances of droplet interaction. The coalescence this achieves provides a basis for improved performance of downstream separators, the efficiencies of which are generally strongly dependent on drop size.

Thus the ultrasonic energy is used for coalescing droplets of one liquid dispersed in another liquid where the liquids have differing acoustic properties. This is particularly, applicable when the liquids constitute an oil phase and a water phase.

In a second aspect of the invention there is provided degassing apparatus arranged to evolve and/or agglomerate gaseous bubbles in a gas/liquid mixture comprising a transducer arranged to impart vibrational energy to the mixture and a reflector located generally opposite the transducer, the transducer being arranged to impart vibrational energy in the frequency range 200 kHz to 3 MHz and more particularly in the range 20 kHz to 800 kHz. In this case, the ultrasonic energy is used for evolving and/or agglomerating gas bubbles (foam) developed in or with liquids. More particularly, when the gas is hydrocarbon gas and the liquids are hydrocarbon liquids and or water. Most particularly when the gas and liquids result from the activities of production, transport and storage of natural gas and crude oil.

In a further aspect, the invention provides a cell comprising a transducer couplable to drive electronics, a reflector and at least one baffle extending between the transducer and the reflector and dividing the space between the transducer and reflector into separate volumes, the baffles being arranged in use to be sufficiently rigid to generally prevent vibration passing between the volumes.

Preferably a plurality of such cells may be arranged to be generally co-planar in a matrix or honeycomb configuration in order to condition a larger volume of material over time than a single cell.

Optionally, a plurality of such cells may be arranged in series along a pipe, the pipe being arranged to carry a flow of material to be conditioned.

In a method aspect, the invention provides a method of increasing droplet size of a liquid dispersed in another liquid comprising passing vibrational energy through the liquid in a plurality of volumes defined by at least one baffle extending between a transducer and a reflector.

In a further method aspect, the invention provides evolving and/or agglomeration of bubbles of gaseous material dispersed in liquid by passing vibrational energy through the liquid in a plurality of volumes defined by at least one baffle extending between a transducer and a reflector.

Although techniques are described below in connection with separation of a dispersed oil phase in a continuous water phase, it will be understood that they have general application in the treatment of any liquid dispersed in another liquid, and/or any liquid containing dissolved or dispersed gas.

BRIEF DESCRIPTION OF THE DRAWINGS

Preferred embodiments of the invention will now be described with reference to the drawings.

FIG. 1 is a schematic cross-section of a generally square section vessel with apparatus in accordance with the invention applied to the external surface thereof;

FIG. 2 is a schematic cross-section of a generally square section vessel with apparatus generally in accordance with the invention contained internally;

FIG. 3 is a schematic cross-section of a generally circular section vessel with apparatus in accordance with the invention contained therein;

FIG. 4 is a schematic cross-section of a generally circular section vessel with apparatus in accordance with the invention applied to the external surface;

FIG. 5 is a schematic cross-section of a generally circular section vessel showing apparatus in accordance with the invention contained therein.

DETAILED DESCRIPTION

Figure 6:
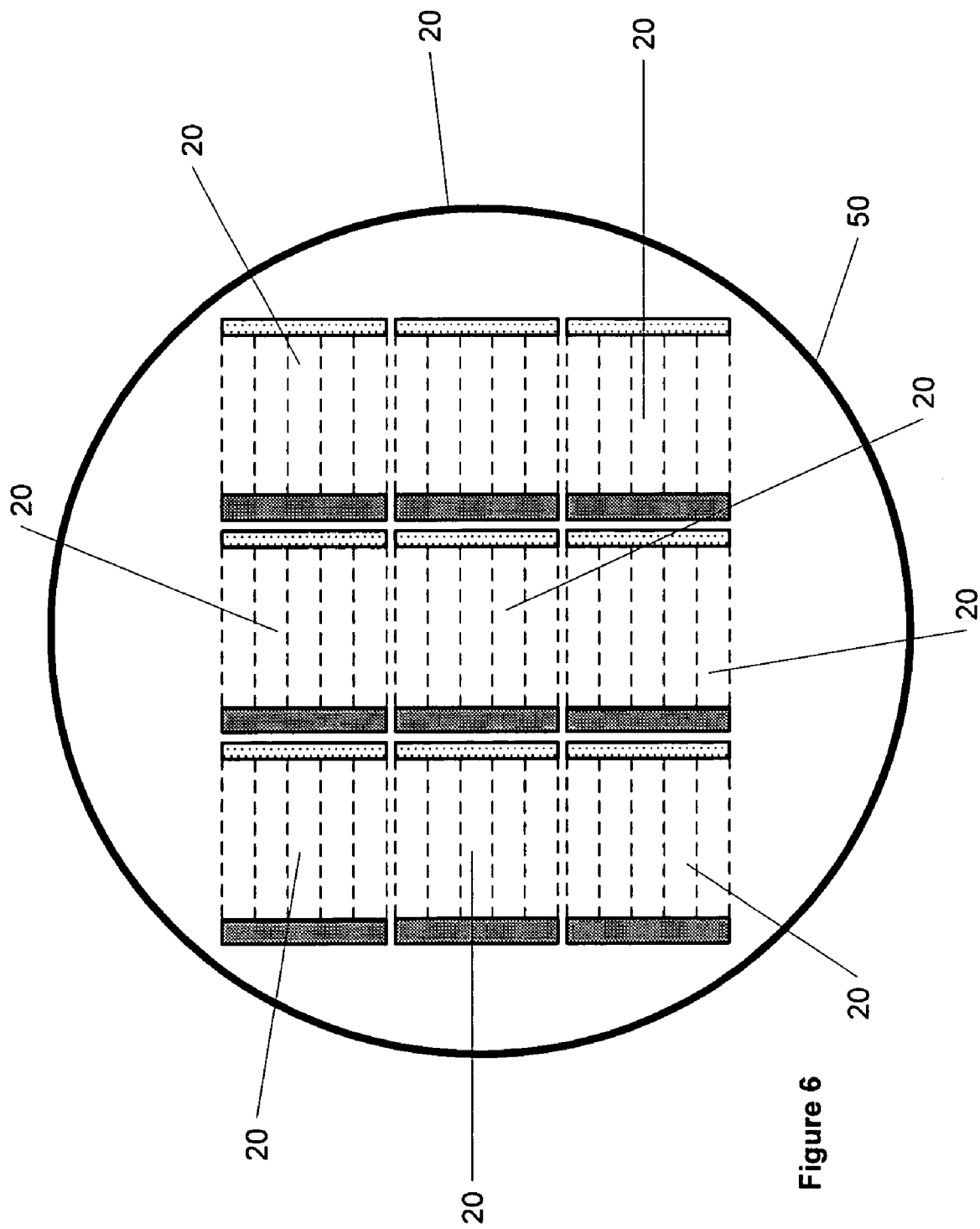
FIG. 6 is a schematic cross-section of a generally circular vessel with a matrix of cells in accordance with the invention contained therein.

With reference to FIG. 1, a generally square section vessel 2 has a transducer 4 mounted along one side and a reflector 6 mounted on the opposite side of the vessel 2. The transducer 4 is typically formed as a piezoelectric layer 5 which converts an oscillating electrical voltage applied across the layer into a corresponding mechanical vibration, with an optional carrier 8. Typically, the layer 5 is made from a piezoceramic material.

The transducer 4 is optionally coupled to the vessel 2 by a carrier 8 which effectively provides impedance matching between the transducer and the vessel wall. The carrier 8 represents an electrically insulative layer which isolates the piezoceramic layer 5 from the liquid. Its thickness and acoustic impedance are important for achieving efficient transmission of acoustic energy into the vessel 2. However, in some applications and including the other embodiments described below, the transducer 4 may be mounted directly to the wall of the vessel 2 and the carrier 8 may be omitted. Similarly, the reflector 6 may also be omitted in some applications.

In use, the transducer 4 is electrically coupled to a drive circuit (not shown) which is operable to cause the transducer to vibrate at ultrasonic frequencies (typically in the range 200 kHz to 1.5 MHz and optionally in the range 400 kHz to 15 MHz for coalescing operation or 20 kHz to 800 kHz for defoaming/degassing operation. The transducer 4 may, for example, be made from a piezoceramic material which changes dimension with the application of voltage across the material.

In the space generally marked 10, fluid is contained. In a preferred embodiment, the fluid flows between the transducer 4 and the reflector 6 in a plane into or out of the drawing sheet. Also, the transducer and reflector are generally co-extensive into and/or out of the plane of the sheet. Thus fluid flowing through the apparatus spends a period of time flowing between the reflector and transducer (the period depending on the flow rate of the liquid and the length of extension of the transducer and reflector).

In coalescer operation, as ultrasonic energy is passed through the liquid, if standing waves are set up within the vessel 2, material of different densities within the liquid tend to separate and material gathers at the nodes or antinodes of the standing wave which is created. In the case of oil dispersed in water, typically oil droplets begin to coalesce at the pressure antinodes of the standing waves. These coalesced droplets may then more readily be separated using conventional apparatus downstream of the ultrasonic coalescing portion of the vessel.

Thus the vessel may, for example, be a pipe and advantageously may be retrofitted with the transducer 4, carder 8 and reflector 6. Alternatively, a single transducer may be used in which case the pipe wall may act as both carrier and reflector. Also, a transducer may act as a reflector. Thus any combination of these components (carrier, transducer and reflector) may be used in appropriate circumstances; the minimum configuration being an unmounted transducer 5. The components may be duplicated, for example, by placing a plurality of transducers carrier and reflectors in a direction extending into the plane of the figure. This allows the units to have a cumulative effect as fluid flows along the pipe. Different units may also be tuned differently (by adjusting power, transducer/reflector characteristics and/or frequency) to take account of differing average droplet sizes along the length of the pipe.

Typically the distance between the transducer and reflector is of the order of 10 to 100 mm for droplet coalescence, and may be up to 250 mm or more for defoaming/degassing applications. This has been found to give good results in the frequency range mentioned above, with fine dispersions of water in oil or oil in water having dispersion droplets of the order of 1 to 100 μm and at flow rates of tens of $m^3$/hr at velocities in the range 0.01 to 0.2 m/s.

Preferably, the frequency of the transducer operation is automatically controlled to keep the whole system at resonance (which will generally provide standing waves). Input power levels are preferably kept as high as possible; the limiting factor being cavitation within the liquid and/or acoustic streaming which causes turbulence and results in turbulent mixing of the fluid. Typically, following coalescence or defoaming, the fluid is passed through a separator. The output quality of the oil or water stream may be monitored downstream of the separator and the results may be used to produce a feedback signal to adjust the operating parameters of the transducer.

Generally, increased power levels are desirable since this produces a stronger coalescing or de-foaming/degassing effect. By providing baffles 12 which divide the area of the vessel 2 into a matrix of smaller channels, the point at which acoustic streaming occurs with increasing ultrasonic power put into the fluid, may be deferred. Thus higher power intensities may be applied to the fluid using baffles of the type shown in FIG. 1.

Streaming typically is a function of non-linearities in power emission over the surface of the transducer. Without constraint this can lead to acoustically driven turbulence which may disrupt the coalescing effect. The constraint offered by baffles tends to delay the onset of streaming and ensures that if it occurs it does so only in localised areas.

The dimensions of the channels formed by the baffles has been found to be most effective when the distance L between the carrier 8 and reflector 6 is greater than the width W of the channel defined between the baffles 12.

With reference to FIG. 2, an alternative approach is to insert a cell 20 having baffles 12', a transducer 4', and reflector 6' contained within a vessel 22. Preferably, the area between the cell 20 and the inner surface of the vessel 22 is made substantially fluid tight (although some leaks may be permitted) to force flowing fluid through the cell 20. An alternative is to carry out conditioning in a batch process whereby a body of liquid is let into the vessel, the vessel is closed, the apparatus is activated and subsequently the vessel is opened to release liquid having larger droplet sizes for the dispersed phase.

FIG. 3 shows an alternative embodiment in which a cell 20 is contained within a generally circular section vessel 24. In other respects, the cell 20 may be similar to that of FIG. 2.

FIG. 4 shows the application of the technique to a circular section vessel 30. In this case, the vessel 30 is surrounded by carrier material 32 which acts both as carrier and reflector (as in the case of the earlier embodiments in which the same material may be used).

A curved or flat transducer 34 is mounted to the outside of the carrier 32. Baffles 36 preferably form smaller channels as discussed above and extend generally away from the transducer 34 towards the opposite side of the vessel 30. This embodiment may readily be retrofitted to an existing pipe arrangement.

FIG. 5 shows an alternative embodiment for dealing with circular section vessels. In this case, a vessel 40 has a generally axial transducer 42 mounted centrally therein. An optional carrier 44 surrounds the transducer 42 and a reflector 46 surrounds the outer surface of the vessel 40. Radial baffles 48 improve the power absorption characteristics of the fluid in the way described above.

FIG. 6 shows a technique for dealing with large section vessels or pipes. The drawing shows a circular section vessel 60 although it will be appreciated that the vessel may be any section. Presently, the size of the cell 20 (FIG. 2) has been found to have a limited maximum size. This is due, for example, to losses in the liquid (and the above mentioned limitation on the amount of power which may be put into the liquid before cavitation/streaming occurs) and non-linearities in the transducers particularly at high driving levels. Nevertheless, for situations in which the vessel cross-section is very much larger than a maximum desired size of cell 20, the cells may simply be placed into a generally co-planer matrix or honeycomb form as shown in FIG. 6. In this way, no liquid bottleneck is caused and yet the performance of the individual cells is unaffected. It will be appreciated that the matrix may be formed in any shape and need not be a 9×9 matrix as shown here.

Similarly, it will be appreciated that several cells could be placed in series. Alternative embodiments may include apparatus mounted at the oil interfaces in an existing separator in order to increase the rate of resolution of and to promote separation at the interface and provide a more sharply defined interface between liquids such as oil and water or at a gas/liquid interface. Thus it will be appreciated that the use of the apparatus may conveniently be targeted at problem areas in existing process equipment.

Other adjustments include operating the apparatus for longer periods of time at lower powers (which achieves the same result although slower) and using alternative materials for the transducer such as magneto-restrictive materials (which typically have lower operating frequencies of the order of 100 KHz or less). In the case of the embodiments of FIGS. 2 and 3, it will be noted that the space between the outside of the cell 20 and the internal surface of the vessels (22 and 24 respectively) typically would be pressurised to the same pressure as the liquid flowing through the cell 20. In oil processes, the pressure within the cell may be of the order of 10 bar(a)?) or higher. Using a fluid connection from the internal area of the cell via a suitable isolating diaphragm, clean generally non-compressible, material such as transformer oil, may be used to pressurize the reverse side of the cell 20 (i.e. the area between the cell outer surface and the cell inner surface). Alternatively, process liquid may be allowed into the area behind the cell. This not only helps to prevent damage to the cell from loads caused by excessive pressure differentials but may also provide an insulating medium to facilitate electrical connection to the transducer(s) and to ensure that all process liquid is treated.

What is claimed is:

1. Coalescing apparatus for increasing the droplet size of a flowing mixture formed as a liquid dispersed in another liquid comprising an ultrasonic transducer arranged to impart vibrational energy to the mixture and a reflector located generally opposite the transducer, the apparatus further being arranged to flow the mixture perpendicular to a notional line between the transducer and reflector and including at least one baffle extending in a direction generally between the transducer and the reflector and which divides the space between the transducer and reflector into separate volumes, the baffles being arranged in use to be sufficiently rigid to generally prevent transmission of vibration between the volumes.

2. Apparatus according to claim 1, wherein the baffle divides the space into volumes which are longer in a direction extending between the transducer and the reflector than their maximum transverse dimension.

3. Apparatus according to claim 1, wherein the transducer is mounted generally centrally in a vessel and wherein the or each baffle extends generally radially towards the outer wall of the vessel.

4. Apparatus according to claim 1 wherein the reflector is formed as another transducer.

5. Apparatus according to claim 1, wherein the transducer is mounted to a wall of a vessel, the mixture is contained in the vessel and the reflector is integral with a wall of the vessel.

6. Apparatus according to claim 1, wherein the transducer is arranged to be mounted inside a vessel containing the mixture.

7. Apparatus according to claim 6, wherein the transducer defines a space between its rear surface and the inner wall of the vessel and wherein that space is filled with a generally non-compressible material at a pressure generally equivalent to that of the mixture.

8. Apparatus according to claim 1, wherein the reflector is arranged to be mounted inside a vessel containing the mixture.

9. Apparatus according to claim 8, wherein the reflector defines a space between its rear surface and the inner wall of the vessel and wherein that space is filled with a generally non-compressible material at a pressure generally equivalent to that of the mixture.

10. Apparatus according to claim 1, wherein the transducer and/or reflector is arranged to be mounted to a vessel having a generally circular cross-section.

11. Apparatus according to claim 1, wherein the transducer and/or reflector is arranged to be mounted to a vessel having a generally rectangular cross-section.

12. Apparatus according to claim 1 including tuning means arranged to adjust the energisation frequency fed to the transducer to ensure that the transducer operates near or at a resonant frequency.

13. Apparatus according to claim 1 including tuning means arranged to adjust the energisation frequency fed to the transducer to ensure that the transducer operates to create standing waves in the liquid.

14. Apparatus according to claim 1 including tuning means arranged to adjust the energisation frequency fed to the transducer to ensure that the transducer operates near or at a predetermined frequency.

15. Apparatus according to claim 1 including a carrier and/or reflector formed from glass, aluminium or steel.

16. Apparatus according to claim 1 wherein the distance between the transducer and the reflector is in the range 10 to 250 mm and more particularly in the range 10 to 100 mm.

17. Apparatus according to claim 1 wherein the transducer is arranged to operate in the frequency range 200 kHz to 3 MHz and more particularly in the range 400 kHz to 1.5 MHz.

18. Apparatus according to claim 1 arranged to treat liquid as it flows between the transducer and the reflector.

19. De-foaming/degassing apparatus arranged to evolve and/or agglomerate gaseous bubbles in a gas/liquid mixture comprising a transducer arranged to impart vibrational energy to the mixture and a reflector located generally opposite the transducer, the apparatus further arranged to flow the mixture perpendicular to a notional line between the transducer and reflector and including at least one baffle extending in a direction generally between the transducer and the reflector and which divides the space between the transducer and reflector into separate volumes, the baffles being arranged in use to be sufficiently rigid to generally prevent vibration passing between the volumes.

20. Apparatus according to claim 19, wherein the baffle divides the space into volumes which are longer in a direction extending between the transducer and the reflector than their maximum transverse dimension.

21. Apparatus according to claim 19, wherein the transducer is mounted generally centrally in a vessel and wherein the or each baffle extends generally radially towards the outer wall of the vessel.

22. Apparatus according to claim 19, wherein the reflector is formed as another transducer.

23. Apparatus according to claim 19, wherein the transducer is mounted to a wall of a vessel, the mixture is contained in the vessel and the reflector is integral with a wall of the vessel.

24. Apparatus according to claim 19 wherein the transducer is arranged to be mounted inside a vessel containing the mixture.

25. Apparatus according to claim 24, wherein the transducer defines a space between its rear surface and the inner wall of the vessel and wherein that space is filled with a generally non-compressible material at a pressure generally equivalent to that of the mixture.

26. Apparatus according to claim 19, wherein the reflector is arranged to be mounted inside a vessel containing the mixture.

27. Apparatus according to claim 26, wherein the reflector defines a space between its rear surface and the inner wall of the vessel and wherein that space is filled with a generally non-compressible material at a pressure generally equivalent to that of the mixture.

28. Apparatus according to claim 19, wherein the transducer and/or reflector is arranged to be mounted to a vessel having a generally circular cross-section.

29. Apparatus according to claim 19, wherein the transducer and/or reflector is arranged to be mounted to a vessel having a generally rectangular cross-section.

30. Apparatus according to claim 19, including tuning means arranged to adjust the energisation frequency fed to the transducer to ensure that the transducer operates near or at resonance or near or at a predetermined frequency.

31. Apparatus according to claim 19, including tuning means arranged to adjust the energisation frequency fed to the transducer to ensure that the transducer operates to create standing waves in the liquid.

32. Apparatus according to claim 31, wherein the tuning means is arranged to adjust the energisation frequency of the transducer to obtain a maximum or minimum transducer electrical driving load.

33. Apparatus according to claim 19, including a carrier and/or reflector formed from glass, aluminium or steel.

34. Apparatus according to claim 19, wherein the distance between the transducer and the reflector is in the range 10 to 250 mm and more particularly in the range 30 to 200 mm.

35. Apparatus according to claim 19, wherein the transducer is arranged to operate in the frequency range 20 kHz to 3 MHz and more particularly in the range 20 kHz to 800 kHz.

36. Apparatus according to claim 19, arranged to treat liquid as it flows between the transducer and the reflector.

37. A cell comprising a transducer couplable to drive electronics, and a reflector, the cell being arranged to flow a fluid mixture perpendicular to a notional line between the transducer and reflector and further comprising at least one baffle extending between the transducer and the reflector and dividing the space between the transducer and reflector into separate volumes, the baffles being arranged in use to be sufficiently rigid to generally prevent vibration passing between the volumes.

38. Fluid conditioning apparatus comprising a plurality of coalescing apparatuses according to claim 1, wherein the coalescing apparatuses are arranged generally co-planar in a matrix or honeycomb configuration in order to condition a larger volume of liquid over time than a single coalescing apparatus.

39. Fluid conditioning apparatus comprising a plurality of cells according to claim 37, arranged in series along a pipe or in a vessel, the pipe or vessel being arranged to carry a flow of material to be conditioned.

40. Fluid conditioning apparatus comprising a plurality of cells according to claim 1, arranged to be generally co-planar in a matrix or honeycomb configuration in order to condition a larger volume of liquid over time than a single cell.

* * * * *